United States Patent
Shi

(10) Patent No.: US 10,503,251 B2
(45) Date of Patent: Dec. 10, 2019

(54) DISPLAY SYSTEM AND DISPLAY METHOD

(71) Applicant: BOE TECHNOLOGY GROUP CO., LTD., Beijing (CN)

(72) Inventor: Bingchuan Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 121 days.

(21) Appl. No.: 15/567,416

(22) PCT Filed: Apr. 7, 2017

(86) PCT No.: PCT/CN2017/079692
§ 371 (c)(1),
(2) Date: Oct. 18, 2017

(87) PCT Pub. No.: WO2018/014595
PCT Pub. Date: Jan. 25, 2018

(65) Prior Publication Data
US 2018/0292898 A1    Oct. 11, 2018

(30) Foreign Application Priority Data

Jul. 22, 2016    (CN) .......................... 2016 1 0581791

(51) Int. Cl.
*G06F 3/01*    (2006.01)
*G03H 1/22*    (2006.01)
(Continued)

(52) U.S. Cl.
CPC ......... *G06F 3/013* (2013.01); *G02B 27/0093* (2013.01); *G02B 27/2292* (2013.01);
(Continued)

(58) Field of Classification Search
CPC .......... G02B 27/283; G03H 1/12; G03H 1/22; G03H 1/2294; G06F 3/013;
(Continued)

(56) References Cited

U.S. PATENT DOCUMENTS 6,433,760 B1 * 8/2002 Vaissie ................. G01S 17/875
345/8
7,522,344 B1 * 4/2009 Curatu ............... G02B 27/0093
345/8
(Continued)

FOREIGN PATENT DOCUMENTS

CN    101176043 A    5/2008
CN    103248905 A    8/2013
(Continued)

OTHER PUBLICATIONS

David et al., "Design of integrated eye trackerdisplay device for head mounted systems" Proc. SPIE 7419, Infrared Systems and Photoelectronic Technology IV, 741910 (Aug. 27, 2009).*
(Continued)

*Primary Examiner* — Thai Q Tran
*Assistant Examiner* — Stephen R Smith
(74) *Attorney, Agent, or Firm* — Calfee, Halter & Griswold LLP

(57) ABSTRACT

The embodiments of the present invention provide a display system and a display method. The display system includes a projection unit and an eye tracking unit. The projection unit includes a projection light source, a projection lens and a spatial light modulator. The projection lens is located between the projection light source and the spatial light modulator. In a direction of an optical axis of the projection lens, the projection lens includes a first lens portion overlapping with the spatial light modulator and a second lens portion not overlapping with the spatial light modulator. The eye tracking unit includes a camera. An imaging optical path of the camera passes through the second lens portion. The display system and the display method provided by the embodiments of the present invention can be advantageously used in the display field including holographic (Continued)

display, simplifying the optical design, and providing a compact and efficient optical system.

20 Claims, 3 Drawing Sheets

(51) Int. Cl.
    *G06T 7/00*     (2017.01)
    *H04N 5/225*     (2006.01)
    *G06T 7/246*     (2017.01)
    *G02B 27/22*     (2018.01)
    *G02B 27/00*     (2006.01)
    *G03H 1/02*     (2006.01)
    *G06T 7/73*     (2017.01)
    *G02B 27/28*     (2006.01)

(52) U.S. Cl.
    CPC ............ *G03H 1/02* (2013.01); *G03H 1/2294* (2013.01); *G06T 7/0002* (2013.01); *G06T 7/246* (2017.01); *G06T 7/73* (2017.01); *H04N 5/2256* (2013.01); *G02B 27/283* (2013.01); *G03H 2001/0216* (2013.01); *G03H 2222/13* (2013.01); *G03H 2222/16* (2013.01); *G03H 2222/34* (2013.01); *G03H 2222/54* (2013.01); *G03H 2223/17* (2013.01); *G03H 2226/05* (2013.01); *G06T 2207/10016* (2013.01); *G06T 2207/10048* (2013.01); *G06T 2207/30041* (2013.01)

(58) Field of Classification Search
    CPC . G06T 2207/10048; G06T 2207/30041; G06T 7/0002; G06T 7/246; H04N 5/2256
    USPC .............................. 348/78; 345/8; 359/1, 629
    See application file for complete search history.

(56) References Cited

U.S. PATENT DOCUMENTS

| | | | | |
|---|---|---|---|---|
| 8,998,414 | B2 * | 4/2015 | Bohn | G02B 5/20 351/210 |
| 2005/0122549 | A1 * | 6/2005 | Goulanian | G03H 1/30 359/3 |
| 2005/0213182 | A1 * | 9/2005 | Cossairt | G02B 27/2214 359/244 |
| 2008/0198431 | A1 * | 8/2008 | Schwerdtner | G02B 5/1876 359/32 |
| 2010/0045781 | A1 * | 2/2010 | Flon | G03H 1/2205 348/51 |
| 2010/0290120 | A1 * | 11/2010 | Ditto | G01B 11/026 359/573 |
| 2013/0089240 | A1 * | 4/2013 | Northcott | G06K 9/00604 382/117 |
| 2014/0361990 | A1 * | 12/2014 | Leister | G02F 1/1323 345/156 |
| 2014/0375790 | A1 * | 12/2014 | Robbins | G02B 27/0172 348/78 |
| 2015/0192775 | A1 * | 7/2015 | Suzuki | G02B 27/0172 359/630 |
| 2015/0205259 | A1 * | 7/2015 | Kim | G03H 1/2294 359/9 |
| 2016/0026253 | A1 * | 1/2016 | Bradski | G02B 27/225 345/8 |
| 2016/0091722 | A1 | 3/2016 | Liu et al. | |
| 2016/0106581 | A1 * | 4/2016 | Gonzalez | A61F 9/009 128/845 |
| 2016/0262608 | A1 * | 9/2016 | Krueger | A61B 3/0041 |
| 2016/0335475 | A1 * | 11/2016 | Krenzer | G06K 9/00335 |
| 2017/0032173 | A1 * | 2/2017 | Lin | G06K 9/00597 |
| 2017/0108528 | A1 * | 4/2017 | Atlas | G01B 11/002 |
| 2017/0109580 | A1 * | 4/2017 | Kaehler | G02B 27/0093 |
| 2017/0131765 | A1 * | 5/2017 | Perek | G02B 5/3083 |
| 2017/0147859 | A1 * | 5/2017 | Zhang | G02B 27/0093 |
| 2017/0185037 | A1 * | 6/2017 | Lee | G03H 1/2205 |
| 2017/0255012 | A1 * | 9/2017 | Tam | G02B 27/0172 |
| 2017/0255013 | A1 * | 9/2017 | Tam | G02B 27/0172 |
| 2018/0011022 | A1 * | 1/2018 | Tahara | G01H 1/06 |
| 2018/0031944 | A1 * | 2/2018 | McKnight | G02F 1/19 |
| 2018/0122143 | A1 * | 5/2018 | Ellwood, Jr. | G06T 19/006 |
| 2019/0049731 | A1 * | 2/2019 | Knuettel | G02B 5/32 |
| 2019/0086598 | A1 * | 3/2019 | Futterer | G02B 6/0031 |

FOREIGN PATENT DOCUMENTS

| | | | |
|---|---|---|---|
| CN | 104407440 | A * | 3/2015 |
| CN | 104407440 | A | 3/2015 |
| CN | 105652444 | A | 6/2016 |
| CN | 105785571 | A | 7/2016 |
| CN | 105954992 | A | 9/2016 |
| KR | 20130088666 | A | 8/2013 |
| WO | 2008028829 | A1 | 3/2008 |

OTHER PUBLICATIONS

First Office Action for Chinese Patent Application No. 201610581791.0 dated Jan. 25, 2018.
Search Report for International Patent Application No. PCT/CN2017/079692 dated Jun. 30, 2017.

* cited by examiner

500

S501 — performing projection by using a projection light source, a projection lens and a spatial light modulator; in a direction of an optical axis of the projection lens, the projection lens comprising a first lens portion overlapping with the spatial light modulator and a second lens portion not overlapping with the spatial light modulator S502 — performing eye tracking by using a camera, the camera performing imaging with the second lens portion S503 — reflecting light from the second lens portion to the camera by using a beam splitter located between the projection lens and the projection light source S504 — providing illumination to an eye of an observer through the second lens portion

Fig. 5

DISPLAY SYSTEM AND DISPLAY METHOD

RELATED APPLICATIONS

The present application is the U.S. national phase entry of the international application PCT/CN2017/079692, with an international filing date of Apr. 7, 2017, which claims the benefit of Chinese Patent Application No. 201610581791.0, filed on Jul. 22, 2016, the entire disclosures of which are incorporated herein by reference.

TECHNICAL FIELD

The present invention relates to the field of display technology, and more particularly to a display system and a display method.

BACKGROUND

Holographic display technology can reproduce the amplitude and phase information of the recorded scene, provide the image and focus depth information for the eyes of the observer, solve the visual fatigue problems caused by the inconsistency of convergence focusing in the existing stereoscopic display technology, and provide the most realistic effect of stereoscopic display for the observer. The key for realizing real-time holographic display is the high-resolution spatial light modulator. Liquid crystal on silicon (LCoS) device is currently costly and difficult to popularize. As a spatial light modulator, the resolution of the existing liquid crystal display (LCD) is inadequate. Seereal Corporation provided a window holography technology for LCD. The window holographic technology compresses the existing LCD in space by an imaging optical system, thereby providing a high density image modulation wavefront in a small window to realize holographic display. However, due to the limitation of small field of view, the window holographic technology should cooperate with the eye tracking system in naked eye display to enable watching when the eye moves.

SUMMARY

The inventors have found that the existing eye tracking optical system requires a separate configuration of the imaging lens outside the display system to track the eyeball position. On the one hand, in order not to cause occlusion of display, the tracking imaging lens should be bias placed, which is not conducive to the frontal collection for the eye image. On the other hand, it is necessary to firstly locate the eye position in the three-dimensional directions accurately to calculate the offset of the tracking optical path, the requirements on the tracking accuracy and calculation are thus relatively stringent.

Therefore, it is desired to provide a display system and a display method that simplifies the optical design and obtains a compact and efficient optical system.

According to an aspect of the invention, an embodiment of the invention provides a display system. The display system includes a projection unit and an eye tracking unit. The projection unit includes a projection light source, a projection lens and a spatial light modulator. The projection lens is located between the projection light source and the spatial light modulator. In a direction of an optical axis of the projection lens, the projection lens includes a first lens portion overlapping with the spatial light modulator and a second lens portion not overlapping with the spatial light modulator. The eye tracking unit includes a camera. An imaging optical path of the camera passes through the second lens portion.

The display system provided by the embodiment of the present invention uses the peripheral portion of the projection lens as an imaging lens for eye tracking. The image space of the projection unit and the object space of the eye tracking unit are coincident so that the eye can be imaged in the optical axis direction of the projection lens, and the high pass portion of the projection lens can be effectively utilized, so as to realize accurate real-time eye tracking. The display system of the embodiment of the present invention can be advantageously used in the display field including holographic display technology, simplifying the optical design, providing a compact and efficient optical system.

Optionally, the display system further includes a beam splitter located between the projection lens and the projection light source. The beam splitter is configured to reflect light from the second lens portion to the camera.

By applying the beam splitter, normal projection imaging can be realized without changing the projection optical path, the object such as the user's eye can also be imaged with the second lens portion.

Optionally, the beam splitter is a beam splitting plate or a beam splitting prism.

With the beam splitting plate or beam splitting prism, there is no need to consider the polarization direction of the light beams, and the setup for the projection unit and eye tracking unit is simple.

Optionally, the beam splitter is a polarization splitting prism.

With the polarization splitting prism, the polarization direction of the light beams are perpendicular to each other, thereby completely separating the light beam of the projection unit and the light beam of the eye tracking unit, avoiding crosstalk between the projection unit and the eye tracking unit.

Optionally, the eye tracking unit further includes a lighting source. The lighting source is configured to provide illumination to an eye of an observer through the second lens portion.

With the above mentioned configuration, even in a dark environment, accurate eye tracking can be realized by applying active illumination.

Optionally, the lighting source includes an infrared light source.

The light beam emitted by the lighting source is generally used to illuminate the user's eye, therefore applying an infrared light source as a lighting source can reduce the irritation or interference to the user's eye.

Optionally, the projection lens has only one lens.

In order to simplify the system structure, projection can be realized with only one lens.

Optionally, the projection lens includes a plurality of lenses.

By applying the projection lens group (i.e., multiple lenses) for projection, the projection can be flexibly adjusted to meet a variety of design requirements.

Optionally, the projection lens has a circular shape, and the spatial light modulator has a rectangular shape.

With the above mentioned arrangement, the first lens portion corresponding to the spatial light modulator has a rectangular shape, and the peripheral portion of the projection lens (i.e., the second lens portion) still has an imaging function, thereby realizing imaging of the user's eye. Similarly, the projection lens and the spatial light modulator can also have other shapes respectively, as long as the projection lens includes a first lens portion overlapping with the spatial light modulator and a second lens portion not overlapping with the spatial light modulator in the direction of the optical axis of the projection lens.

Optionally, the projection light source includes a laser. Optionally, the projection unit further includes a beam expander, a micro objective lens, a pinhole filter and a rectangular diaphragm sequentially disposed between the projection light source and the projection lens.

By applying the pinhole filter, the projection light source provides illumination of an approximate point source that does not allow light with other spatial frequencies to pass through, eliminating stray light. With the laser light source, the laser beam is modulated by the spatial light modulator, holographic display can thus be realized.

Optionally, the second lens portion is located on the periphery of the first lens portion.

By applying the second lens portion located on the periphery of the first lens portion, the high pass portion of the projection lens can be effectively utilized, so as to realize accurate real-time eye tracking.

According to another aspect of the present invention, an embodiment of the present invention provides a display method. The display method includes the following steps: performing projection by using a projection light source, a projection lens and a spatial light modulator; in a direction of an optical axis of the projection lens, the projection lens including a first lens portion overlapping with the spatial light modulator and a second lens portion not overlapping with the spatial light modulator; and performing eye tracking by using a camera, the camera performing imaging with the second lens portion.

The display method provided by the embodiment of the present invention uses the peripheral portion of the projection lens as an imaging lens for eye tracking. The image space of the projection unit and the object space of the eye tracking unit are coincident so that the eye can be imaged in the optical axis direction of the projection lens, and the high pass portion of the projection lens can be effectively utilized so as to realize accurate real-time eye tracking. The display method of the embodiment of the present invention can be advantageously used in the display field including holographic display technology, simplifying the optical design, providing a compact and efficient optical system.

Optionally, the method further includes reflecting light from the second lens portion to the camera by using a beam splitter located between the projection lens and the projection light source.

By applying the beam splitter, normal projection imaging can be realized without changing the projection optical path, the object such as the user's eye can also be imaged with the second lens portion.

Optionally, the method further includes providing illumination to an eye of an observer through the second lens portion.

With the above mentioned configuration, even in a dark environment, accurate eye tracking can be realized by applying active illumination.

Optionally, the step of providing illumination to an eye of an observer through the second lens portion includes: providing infrared illumination to an eye of an observer through the second lens portion.

The light beam emitted by the lighting source is generally used to illuminate the user's eye, therefore applying an infrared light source as a lighting source can reduce the irritation or interference to the user's eye.

Optionally, the step of performing eye tracking by using a camera includes: determining an azimuth angle of the eye based on a boundary between iris and sclera.

Based on image processing, the azimuth angle of the eye can be easily determined based on the boundary between the iris and the sclera. For example, eyes with different azimuth angles can be directly imaged at different positions on the camera. After the azimuth angle and imaging position are calibrated, the corresponding azimuth angle can be calculated by simply determining the coordinate position of the eye in the image received by the camera.

Optionally, the step of performing eye tracking by using a camera includes: determining a distance between the eye and the projection lens based on clarity of an eye feature.

In holographic display, the distance between the eye and the display system is a necessary parameter for hologram calculation. If the distance does not vary greatly, it is possible to consider only the azimuth angle. If the distance varies greatly, the change in distance should also be taken into account. When the object is clearly imaged, there is a corresponding relationship between the imaging parameters of the camera (such as but not limited to: the focal length of the camera's zoom lens group) and the object distance (i.e., the distance between the eye and the camera). By reading the focal length of the zoom lens group, the distance between the eye and the camera can be obtained, thereby calculating the distance between the eye and the projection lens.

BRIEF DESCRIPTION OF THE DRAWINGS

In order to more clearly illustrate the technical solutions in embodiments of the invention or in the prior art, the appended drawings needed to be used in the description of the embodiments or the prior art will be introduced briefly in the following. Obviously, the drawings in the following description are only some embodiments of the invention, and for those of ordinary skills in the art, other drawings may be obtained according to these drawings under the premise of not paying out creative work.

FIG. 5 shows a flowchart of a display method according to an embodiment of the present invention.

DETAILED DESCRIPTION OF THE INVENTION

In the following, the technical solutions in embodiments of the invention will be described clearly and completely in connection with the drawings in the embodiments of the invention. Obviously, the described embodiments are only part of the embodiments of the invention, and not all of the embodiments. Based on the embodiments in the invention, all other embodiments obtained by those of ordinary skills in the art under the premise of not paying out creative work pertain to the protection scope of the invention.

Figure 1:
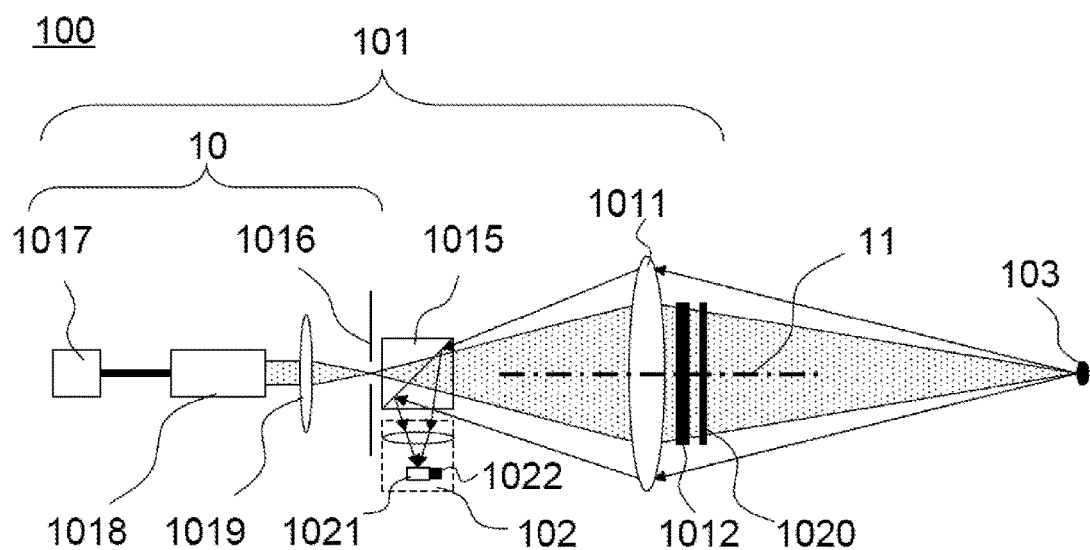
FIG. 1 shows a structural schematic diagram of a display system according to an embodiment of the invention.
Figure 2:
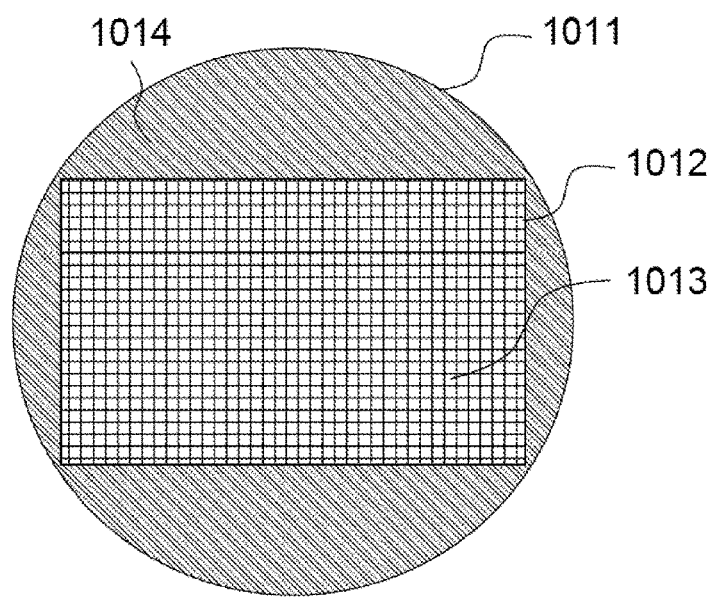
FIG. 2 shows a schematic diagram of a projection lens and a spatial light modulator in a display system according to an embodiment of the present invention.

According to an aspect of the invention, an embodiment of the invention provides a display system. As shown in FIG. 1 and FIG. 2, the display system 100 includes a projection unit 101 and an eye tracking unit 102. The projection unit 101 includes a projection light source 10, a projection lens 1011 and a spatial light modulator 1012. The projection lens 1011 is located between the projection light source 101 and the spatial light modulator 1012. As shown in FIG. 2, in a direction of an optical axis 11 of the projection lens 1011, the projection lens 1011 includes a first lens portion 1013 overlapping with the spatial light modulator 1012 and a second lens portion 1014 not overlapping with the spatial light modulator 1012. The eye tracking unit 102 includes a camera 1021. An imaging optical path of the camera 1021 passes through the second lens portion 1014. In the context of the application, the "imaging optical path of the camera" refers to the propagation path of the external light applied for imaging in the camera. Moreover, the term "camera" refers to an equipment that uses the principle of optics to image and records images, including but not limited to, camera and video camera.

The display system provided by the embodiment of the present invention uses the peripheral portion of the projection lens 1011 as an imaging lens for eye tracking. The image space of the projection unit 101 and the object space of the eye tracking unit 102 are coincident so that the eye 103 can be imaged in the optical axis direction of the projection lens 1011, and the high pass portion of the projection lens 1011 can be effectively utilized, so as to realize accurate real-time eye tracking. The display system of the embodiment of the present invention can be advantageously used in the display field including holographic display technology, simplifying the optical design, providing a compact and efficient optical system.

In the context of the invention, each "unit" in the embodiments can be realized by a computer (e.g. personal computer) or a combination of a computer and a suitable sensor; the processing of each "unit" can be realized e.g. by a processor in the computer.

In the imaging optical system, the increase in the aperture of the lens is helpful to improve the imaging luminous flux, thus enhancing the adaptability of the imaging detection system in the dark environment. Moreover, the aperture of the lens is one of the determinants for the optical imaging resolution, and the imaging resolution directly affects the accuracy of eye detection. Therefore, imaging lenses with large aperture are extremely advantageous for eye tracking.

Figure 3:
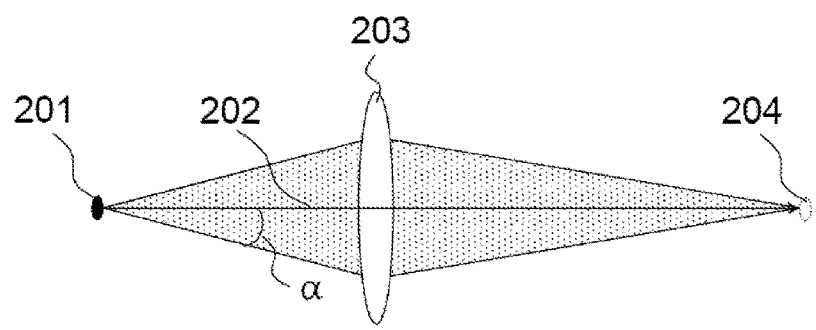
FIG. 3 shows a schematic diagram of the spatial frequency in lens imaging.

FIG. 3 shows an optical path of lens imaging. Along the optical axis 202 and through the lens 203, the light beam emitted from the object point 201 is imaged on the image point 204, the imaging light beam has a cone shaped distribution along the optical axis. In Fourier optics, the spatial frequency f of a light beam is defined as the ratio of the sine of the angle $\alpha$ (i.e., the angle between the light beam and the optical axis) to the wavelength, i.e., $f=(\sin \alpha)/\lambda$. As the angle $\alpha$ increases, the corresponding spatial frequency increases. The maximum spatial frequency of the object's light that can be received by the optical system determines the maximum imaging resolution of the optical system. During the imaging process, the overall light and shade distribution of the image is mainly formed by the paraxial low-frequency beam, and the detail texture is mainly formed by the peripheral high-frequency beam. In an embodiment of the present invention, the low-frequency information is blocked and modulated by the spatial light modulator. Therefore, the second lens portion constitutes a high pass filter imaging device, and the resulting image mainly contains detailed information of the object, including brightness mutation, texture, region boundaries, etc. Thus, as shown in FIG. 1 and FIG. 2, when the eye 103 is imaged, the high pass imaging characteristic of the second lens portion 1014 can exactly provide detailed information such as image texture and the like in the vicinity of the eye for image recognition and tracking.

Optionally, as shown in FIG. 1, the display system 100 further includes a beam splitter 1015 located between the projection lens 1011 and the projection light source 10. The beam splitter 1015 is configured to reflect light from the second lens portion 1014 to the camera 1021.

By applying the beam splitter 1015, normal projection imaging can be realized without changing the projection optical path, the object such as the user's eye can also be imaged with the second lens portion 1014.

Optionally, the beam splitter 1015 is a beam splitting plate or a beam splitting prism.

With the beam splitting plate or beam splitting prism, there is no need to consider the polarization direction of the light beams, and the setup for the projection unit and eye tracking unit is simple.

Optionally, the beam splitter 1015 is a polarization splitting prism.

With the polarization splitting prism, the polarization direction of the light beams are perpendicular to each other, thereby completely separating the light beam of the projection unit and the light beam of the eye tracking unit, avoiding crosstalk between the projection unit and the eye tracking unit.

Optionally, the eye tracking unit 102 further includes a lighting source 1022. The lighting source 1022 is configured to provide illumination to an eye of an observer through the second lens portion 1014.

With the above mentioned configuration, even in a dark environment, accurate eye tracking can be realized by applying active illumination. In particular, due to the reversibility of the optical path, the lighting source 1022 can be arranged at, for example, the position of the camera 1021, thereby providing active illumination.

Optionally, the lighting source 1022 includes an infrared light source.

The light beam emitted by the lighting source is generally used to illuminate the user's eye, therefore applying an infrared light source as a lighting source can reduce the irritation or interference to the user's eye.

Figure 4:
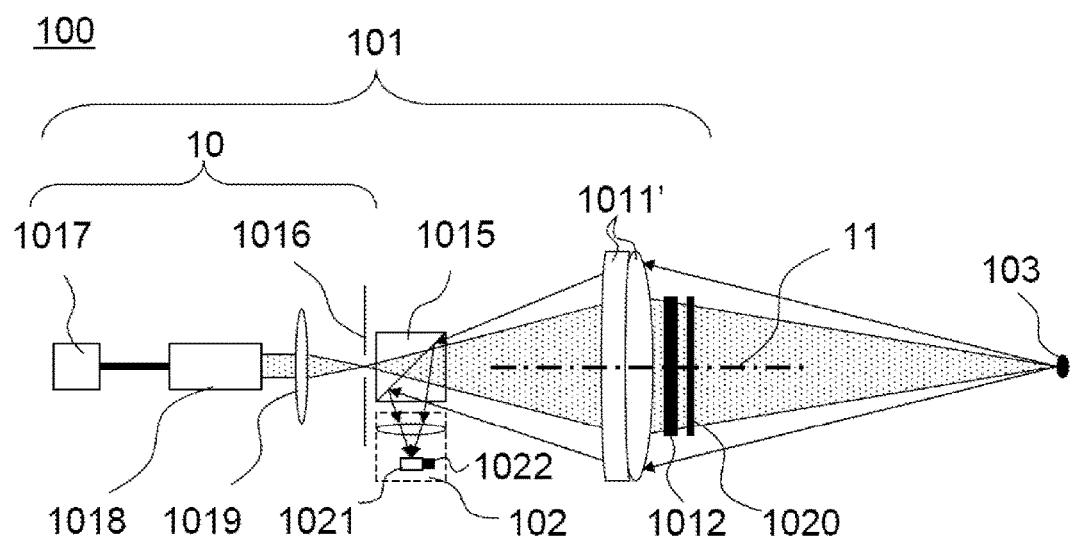
FIG. 4 shows a structural schematic diagram of a display system according to another embodiment of the invention.

In the above mentioned embodiment, the projection lens 1011 is used for projection. However, it can be understood by those skilled in the art that the projection lens 1011 can also be replaced with a projection lens group (i.e., a plurality of lenses). As shown in FIG. 4, the peripheral portion of the projection lens group 1011' can be used as an imaging lens for eye tracking, thereby achieving accurate real-time eye tracking.

Optionally, as shown in FIG. 1, the projection lens 1011 has only one lens.

In order to simplify the system structure, projection can be realized with only one lens.

Optionally, as shown in FIG. 4, the projection lens 1011' includes a plurality of lenses.

By applying the projection lens group (i.e., multiple lenses) for projection, the projection can be flexibly adjusted to meet a variety of design requirements.

Optionally, as shown in FIG. 2, viewed in the direction along the optical axis of the projection lens, the projection lens 1011 has a circular shape, and the spatial light modulator 1012 has a rectangular shape.

With the above mentioned arrangement, the first lens portion 1013 corresponding to the spatial light modulator has a rectangular shape, and the peripheral portion of the projection lens (i.e., the second lens portion 1014) still has an imaging function, thereby realizing imaging of the user's eye. Similarly, the projection lens and the spatial light modulator can also have other shapes respectively, as long as the projection lens includes a first lens portion overlapping with the spatial light modulator and a second lens portion not overlapping with the spatial light modulator in the direction of the optical axis of the projection lens.

Optionally, the projection light source 10 includes a laser 1017. Optionally, the projection unit 101 further includes a beam expander 1018, a micro objective lens 1019, a pinhole filter 1016 and a rectangular diaphragm (not shown) sequentially disposed between the projection light source 10 and the projection lens 1011.

By applying the pinhole filter 1016, the projection light source 10 provides illumination of an approximate point source that does not allow light with other spatial frequencies to pass through, eliminating stray light. With the laser 1017, the laser beam is modulated by the spatial light modulator 1012, holographic display can thus be realized.

Optionally, as shown in FIG. 2, the second lens portion 1014 is located on the periphery of the first lens portion 1013.

By applying the second lens portion located on the periphery of the first lens portion, the high pass portion of the projection lens can be effectively utilized, so as to realize accurate real-time eye tracking.

In some embodiments, as shown in FIG. 1 and FIG. 4, the display system 100 can also include a polarizer 1020 located downstream of the spatial light modulator 1012. With the cooperation of the polarizer and the spatial light modulator, a better effect of holographic display can be achieved. However, it can be understood by those skilled in the art that the polarizer can also be formed in the spatial light modulator, which is not limited in the disclosure.

According to another aspect of the present invention, an embodiment of the present invention provides a display method. As shown in FIG. 5, the display method 500 can include the following steps: S501 performing projection by using a projection light source, a projection lens and a spatial light modulator; in a direction of an optical axis of the projection lens, the projection lens including a first lens portion overlapping with the spatial light modulator and a second lens portion not overlapping with the spatial light modulator; and S502 performing eye tracking by using a camera, the camera performing imaging with the second lens portion.

The display method provided by the embodiment of the present invention uses the peripheral portion of the projection lens as an imaging lens for eye tracking. The image space of the projection unit and the object space of the eye tracking unit are coincident so that the eye can be imaged in the optical axis direction of the projection lens, and the high pass portion of the projection lens can be effectively utilized so as to realize accurate real-time eye tracking. The display method of the embodiment of the present invention can be advantageously used in the display field including holographic display technology, simplifying the optical design, providing a compact and efficient optical system.

Optionally, as shown in FIG. 5, the method further includes step S503: reflecting light from the second lens portion to the camera by using a beam splitter located between the projection lens and the projection light source.

By applying the beam splitter, normal projection imaging can be realized without changing the projection optical path, the object such as the user's eye can also be imaged with the second lens portion.

Optionally, as shown in FIG. 5, the method further includes step S504: providing illumination to an eye of an observer through the second lens portion.

With the above mentioned configuration, even in a dark environment, accurate eye tracking can be realized by applying active illumination.

Optionally, the step of providing illumination to an eye of an observer through the second lens portion includes: providing infrared illumination to an eye of an observer through the second lens portion.

The light beam emitted by the lighting source is generally used to illuminate the user's eye, therefore applying an infrared light source as a lighting source can reduce the irritation or interference to the user's eye.

Optionally, the step of performing eye tracking by using a camera includes: determining an azimuth angle of the eye based on a boundary between iris and sclera.

Based on image processing, the azimuth angle of the eye can be easily determined based on the boundary between the iris and the sclera. For example, eyes with different azimuth angles can be directly imaged at different positions on the camera. After the azimuth angle and imaging position are calibrated, the corresponding azimuth angle can be calculated by simply determining the coordinate position of the eye in the image received by the camera.

Optionally, the step of performing eye tracking by using a camera includes: determining a distance between the eye and the projection lens based on clarity of an eye feature.

In holographic display, the distance between the eye and the display system is a necessary parameter for hologram calculation. If the distance does not vary greatly, it is possible to consider only the azimuth angle. If the distance varies greatly, the change in distance should also be taken into account. When the object is clearly imaged, there is a corresponding relationship between the imaging parameters of the camera (such as but not limited to: the focal length of the camera's zoom lens group) and the object distance (i.e., the distance between the eye and the camera). By reading the focal length of the zoom lens group, the distance between the eye and the camera can be obtained, thereby calculating the distance between the eye and the projection lens.

The display system and display method provided by the embodiment of the present invention uses the peripheral portion of the projection lens as an imaging lens for eye tracking. The image space of the projection unit and the object space of the eye tracking unit are coincident so that the eye can be imaged in the optical axis direction of the projection lens, and the high pass portion of the projection lens can be effectively utilized so as to realize accurate real-time eye tracking. The display system and display method of the embodiment of the present invention can be advantageously used in the display field including holographic display technology, simplifying the optical design, providing a compact and efficient optical system.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:
1. A display system, comprising:
a projection unit and an eye tracking unit;
wherein the projection unit comprises a projection light source, a projection lens and a spatial light modulator;

the projection lens is located between the projection light source and the spatial light modulator;

in a direction of an optical axis of the projection lens, the projection lens comprises a first lens portion overlapping with the spatial light modulator and a second lens portion not overlapping with the spatial light modulator;

the eye tracking unit comprises a camera;

an imaging optical path of the camera passes through the second lens portion; and a paraxial portion of the projection lens serves as the first lens portion thereof, and a peripheral portion of the projection lens serves as the second lens portion thereof.

2. The display system according to claim 1, further comprising a beam splitter located between the projection lens and the projection light source; wherein the beam splitter is configured to reflect light from the second lens portion to the camera.

3. The display system according to claim 2, wherein the beam splitter is a beam splitting plate or a beam splitting prism.

4. The display system according to claim 2, wherein the beam splitter is a polarization splitting prism.

5. The display system according to claim 1, wherein the eye tracking unit further comprises a lighting source; the lighting source is configured to provide illumination to an eye of an observer through the second lens portion.

6. The display system according to claim 5, wherein the lighting source comprises an infrared light source.

7. The display system according to claim 1, wherein the projection lens has only one lens.

8. The display system according to claim 1, wherein the projection lens comprises a plurality of lenses.

9. The display system according to claim 1, wherein the projection lens has a circular shape; the spatial light modulator has a rectangular shape.

10. The display system according to claim 1, wherein the projection light source comprises a laser.

11. The display system according to claim 1, wherein the projection unit further comprises a beam expander, a micro objective lens, a pinhole filter and a rectangular diaphragm sequentially disposed between the projection light source and the projection lens.

12. The display system according to claim 1, wherein the second lens portion is located on the periphery of the first lens portion.

13. A display method, comprising:

projecting with a projection light source, a projection lens and a spatial light modulator;

in a direction of an optical axis of the projection lens, the projection lens comprising a first lens portion overlapping with the spatial light modulator and a second lens portion not overlapping with the spatial light modulator; and performing eye tracking by using a camera, the camera performing imaging with the second lens portion, wherein a paraxial portion of the projection lens serves as the first lens portion thereof, and a peripheral portion of the projection lens serves as the second lens portion thereof.

14. The display method according to claim 13, further comprising: reflecting light from the second lens portion to the camera by using a beam splitter located between the projection lens and the projection light source.

15. The display method according to claim 13, further comprising: providing illumination to an eye of an observer through the second lens portion.

16. The display method according to claim 15, wherein providing illumination to an eye of an observer through the second lens portion comprises: providing infrared illumination to an eye of an observer through the second lens portion.

17. The display method according to claim 13, wherein performing eye tracking by using a camera comprises: determining an azimuth angle of the eye based on a boundary between iris and sclera.

18. The display method according to claim 13, wherein performing eye tracking by using a camera comprises: determining a distance between the eye and the projection lens based on clarity of an eye feature.

19. The display method according to claim 13, wherein the projection unit further comprises a beam expander, a micro objective lens, a pinhole filter and a rectangular diaphragm sequentially disposed between the projection light source and the projection lens.

20. The display method according to claim 13, wherein the second lens portion is located on the periphery of the first lens portion.

* * * * *